(12) United States Patent
House et al.

(10) Patent No.: US 8,814,538 B2
(45) Date of Patent: Aug. 26, 2014

(54) INSULATING SPACER FOR BALL BEARING CARTRIDGE

(75) Inventors: Timothy House, Hendersonville, NC (US); Paul Diemer, Arden, NC (US); Allan Kelly, Hendersonville, NC (US); Augustine Cavagnaro, Flat Rock, NC (US)

(73) Assignee: BorgWarner Inc., Auburn Hills, MI (US)

( * ) Notice: Subject to any disclaimer, the term of this patent is extended or adjusted under 35 U.S.C. 154(b) by 68 days.

(21) Appl. No.: 13/264,484

(22) PCT Filed: Apr. 16, 2010

(86) PCT No.: PCT/US2010/031331
§ 371 (c)(1),
(2), (4) Date: Oct. 14, 2011

(87) PCT Pub. No.: WO2010/123761
PCT Pub. Date: Oct. 28, 2010

(65) Prior Publication Data
US 2012/0023931 A1    Feb. 2, 2012

Related U.S. Application Data

(60) Provisional application No. 61/170,792, filed on Apr. 20, 2009.

(51) Int. Cl.
*F04D 29/049* (2006.01)
*F04D 29/059* (2006.01)

(52) U.S. Cl.
USPC ............................................. 417/407

(58) Field of Classification Search
USPC ........ 415/216.1, 229; 417/406, 407, 408, 409
See application file for complete search history.

(56) References Cited

U.S. PATENT DOCUMENTS

| 4,786,238 A | * | 11/1988 | Glaser et al. ................. 417/53 |
| 7,364,802 B2 | * | 4/2008 | Spitsberg et al. ............. 428/633 |
| 2008/0080966 A1 | * | 4/2008 | Ueno et al. ................... 415/112 |
| 2009/0087299 A1 | * | 4/2009 | Agrawal et al. ................. 415/1 |

FOREIGN PATENT DOCUMENTS

| CN | 1245553 | 2/2000 |
| WO | 9823886 | 4/1998 |

* cited by examiner

*Primary Examiner* — Bryan Lettman
(74) *Attorney, Agent, or Firm* — Miller Canfield (57) ABSTRACT

A turbocharger using a high speed rolling element bearing system is improved in desired speed and life by providing an insulating spacer, with a thermal conductivity lower than that of the material in the inner race of the REB, between the turbine-end of the inner race of the bearing system and the compressor-end face of the piston ring boss to impede the flow of heat from the turbine wheel to the inner race of the rolling element bearing.

11 Claims, 9 Drawing Sheets

INSULATING SPACER FOR BALL BEARING CARTRIDGE

FIELD OF THE INVENTION

This invention addresses the problem of extending the life of rolling element bearings (REBs), such as ball bearing cartridges, in a turbocharger. There is always a need with ball bearing turbochargers to achieve the desired speed and life at the lowest cost. It is clear that reduction of bearing temperature, caused by heat input from the turbocharger turbine wheel to the ball bearing system, has not been recognized as an area of potential for improvement.

BACKGROUND OF THE INVENTION

Turbochargers deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers are a type of forced induction system which use the exhaust flow, entering the turbine housing from the engine exhaust manifold, to drive a turbine wheel (51), which is located in the turbine housing. The turbine wheel is solidly affixed to a shaft to become the shaft and wheel assembly, the other end of which contains a compressor wheel (20) which is mounted to a stub shaft end of the shaft and wheel and held in position by the clamp load from a compressor nut (29). The primary function of the turbine wheel is providing rotational power to drive the compressor.

The compressor stage consists of a wheel (20) and its housing. Filtered air is drawn axially into the inlet of the compressor cover by the rotation of the compressor wheel. The power generated by the turbine stage to the shaft and wheel drives the compressor wheel to produce a combination of static pressure with some residual kinetic energy and heat. The pressurized gas exits the compressor cover through the compressor discharge and is delivered, usually via an intercooler, to the engine intake.

In one aspect of compressor stage performance, the efficiency of the compressor stage is influenced by the clearances between the compressor wheel contour (28) and the matching contour in the compressor cover. The closer the compressor wheel contour is to the compressor cover contour, the higher the efficiency of the stage. On the other hand, the closer the wheel is to the cover, the higher the chance of a compressor wheel rub; so there has to exist a compromise between improving efficiency and improving durability.

The wheel in the compressor stage of a typical turbocharger does not rotate about the geometric axis of the turbocharger, but rather describes orbits roughly about the geometric center of the turbocharger. The geometric center is the geometric axis (100) of the turbocharger.

The dynamic excursions taken by the shaft are attributed to a number of factors including: the unbalance of the rotating assembly; the excitation of the pedestal (i.e., the engine and exhaust manifold); and the low speed excitation from the vehicle's interface with the ground.

The sum effect of these excursions taken by the wheels is that the design of the typical turbocharger must have built in clearances far greater than those desired for aerodynamic efficiency levels.

The typical turbocharger is fed with oil from the engine. This oil, at a pressure, typically equal to that of the engine, performs several functions. The oil is delivered to both sides of the journal bearings (30), via oil galleries (82 and 83) to provide a double hydrodynamic squeeze film, the pressures of which exert reactionary forces of the shaft on the ID of the bearing, and of the OD of the bearing on the bearing housing bore. The oil films provide attenuation of the reactionary forces to reduce the amplitude of the excursions of the shaft. The oil also functions to remove heat from the turbocharger. The heat is carried to the crankcase of the engine as it leaves the turbocharger through the oil drain (85)

A typical turbocharger design has two adjacent bearing systems: one on the compressor-end of the bearing housing; and one on the turbine-end of the bearing housing. Each system has two interfaces: the interface of the rotating shaft on the I.D. of the floating bearing, and the interface of the O.D. of the floating bearing on the fixed bore of the bearing housing.

The stiffness and damping capacities of the typical turbocharger double hydrodynamic squeeze film bearings are a compromise between the thickness of the film generated by the rotational speed of the bearing elements, the clearance between said elements, and the oil flow limitations due to the propensity of turbochargers to pass oil through the piston ring seals at either end of the shaft.

The use of REBs in a turbocharger solves several problems, including: high oil flow rates, bearing damping, and power losses through the bearing system.

Figure 1:
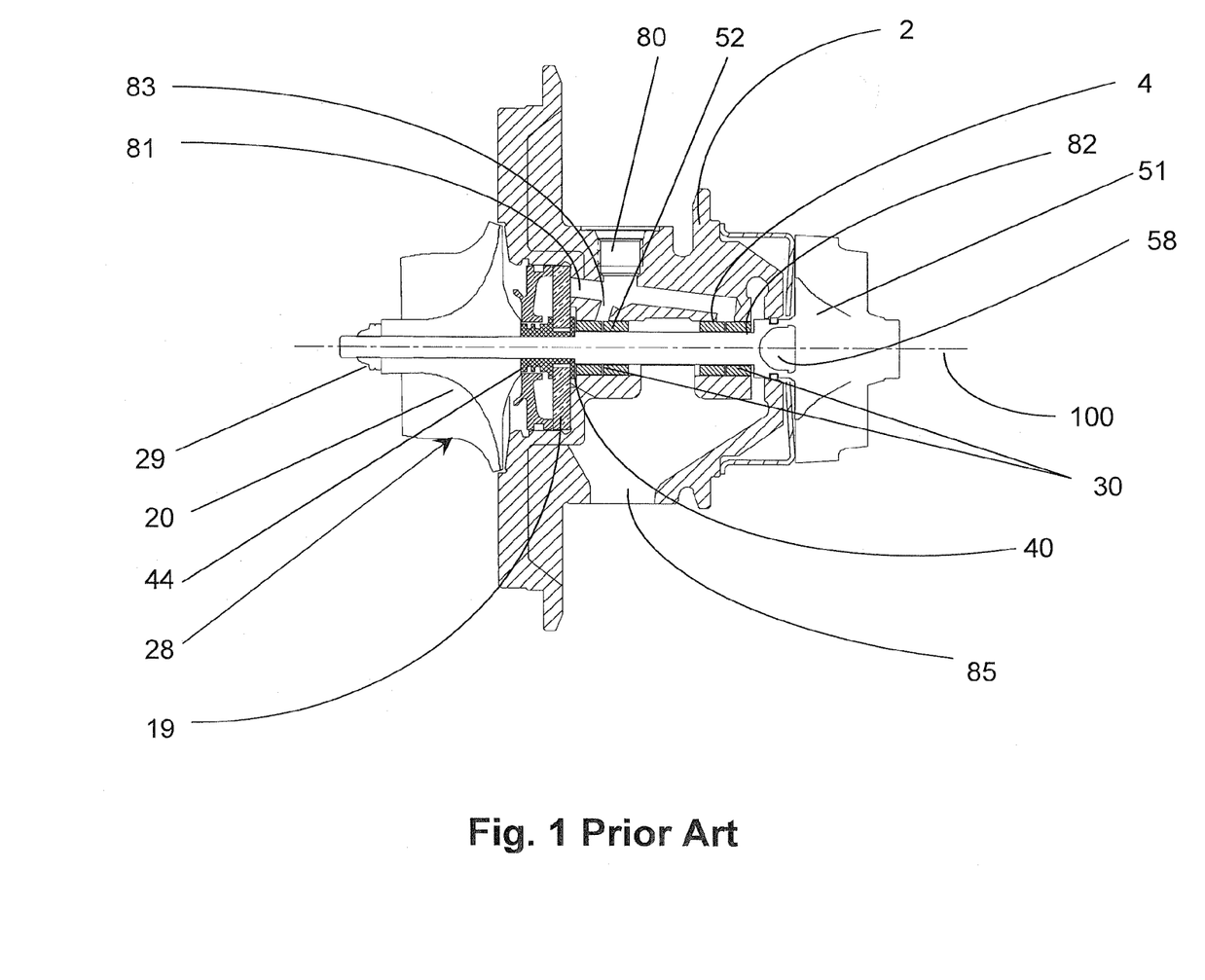
FIG. 1 depicts a section of a turbocharger assembly.

FIG. 1 depicts a typical turbocharger double hydrodynamic squeeze film bearings configuration. In this configuration, oil is received to the bearing housing (2) though an oil inlet (80) from the engine. The oil is pressure fed through the oil gallery (83) to the bearing housing journal bearing bore (4). For both the turbine-end and compressor-end bearings (30), the oil flow is delivered to the shaft and wheel journal bearing zones at which points the oil is distributed around the shaft to generate an oil film between the shaft surface (52) and the inner bore of the floating journal bearings (30). On the outside of the journal bearings (30), a like oil film is generated by the rotation of the journal bearing against the bearing housing journal bearing bore (4).

In the typical turbocharger depicted in FIG. 1, the thrust bearing (19) is also a hydrodynamic or fluid film type of bearing. In this configuration, the stationary thrust bearing is fed oil from the oil gallery (81) to feed oil to a ramp and pad design of bearing. The oil is driven into a wedge shape by the relative motion of the thrust washer (40), and the washer segment of the flinger (44), which is mounted to the shaft, against the static thrust ramp and pad. This bearing controls the axial position of the rotating assembly.

For the typical 76 mm turbine wheel-sized turbocharger discussed above, the oil flow is in the region of 2200 to 4300 grams per minute.

Figure 4:
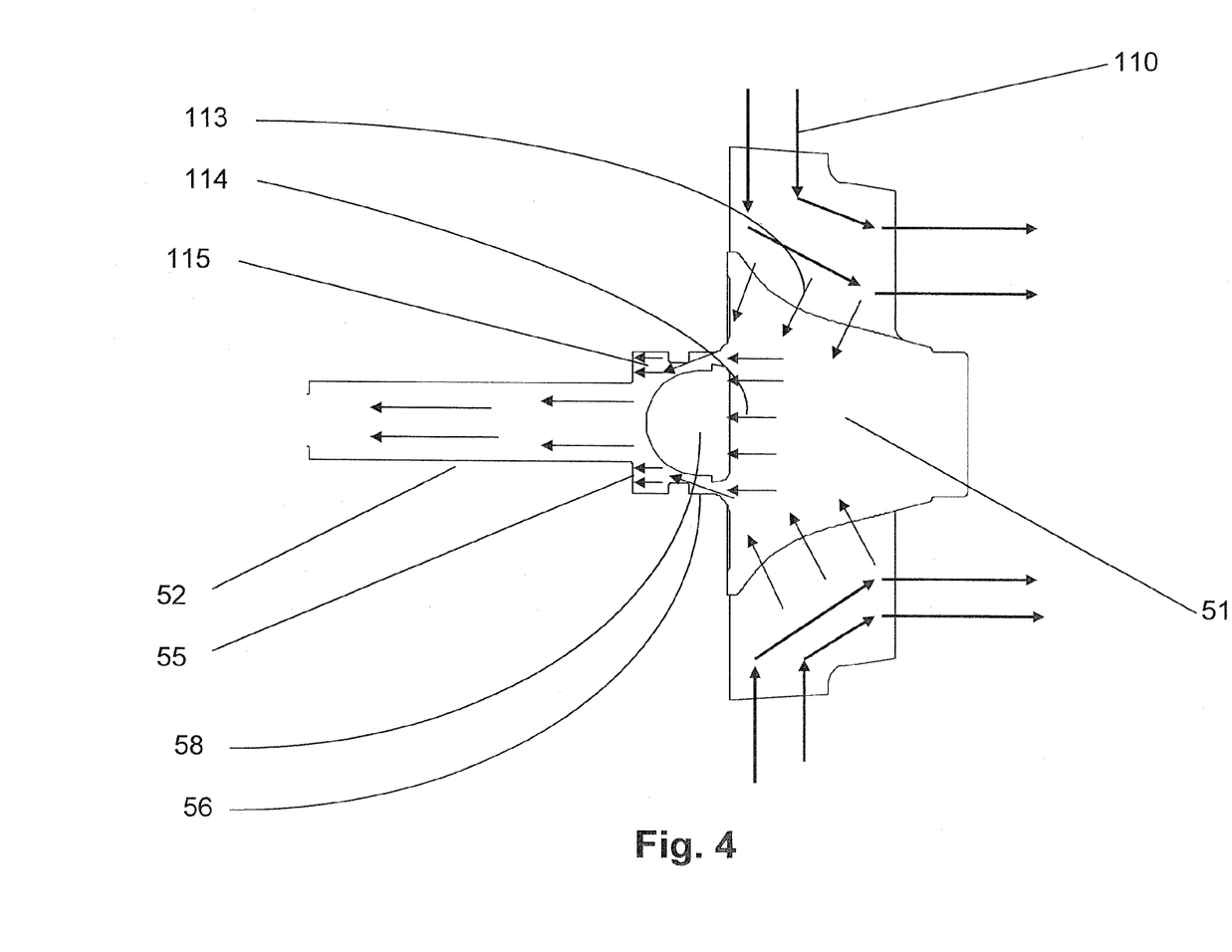
FIG. 4 depicts a section drawing of a shaft and wheel.

FIG. 4 depicts the flow of heat from the exhaust gas (110) which enters the turbine wheel (51) from the turbine housing and exits the turbine wheel on the exducer side, having converted heat energy and velocity into rotational torque to turn the shaft and wheel. The heat energy flow (113) in the material of the turbine wheel flows towards the cooler end of the shaft and wheel. As the heat flow (114) passes into the piston ring boss (56), it runs into the air dam (58). This air dam is constructed when a recess in the back of the turbine wheel and a recess in the front of the shaft of the shaft and wheel are connected (by welding). The thin sections of the periphery of the recesses are welded together, thus forming a closed volume. This volume prevents gross conduction of heat from the turbine wheel to the shaft. The heat flow (115) around the air dam (58) is shown in FIG. 4.

Figure 5:
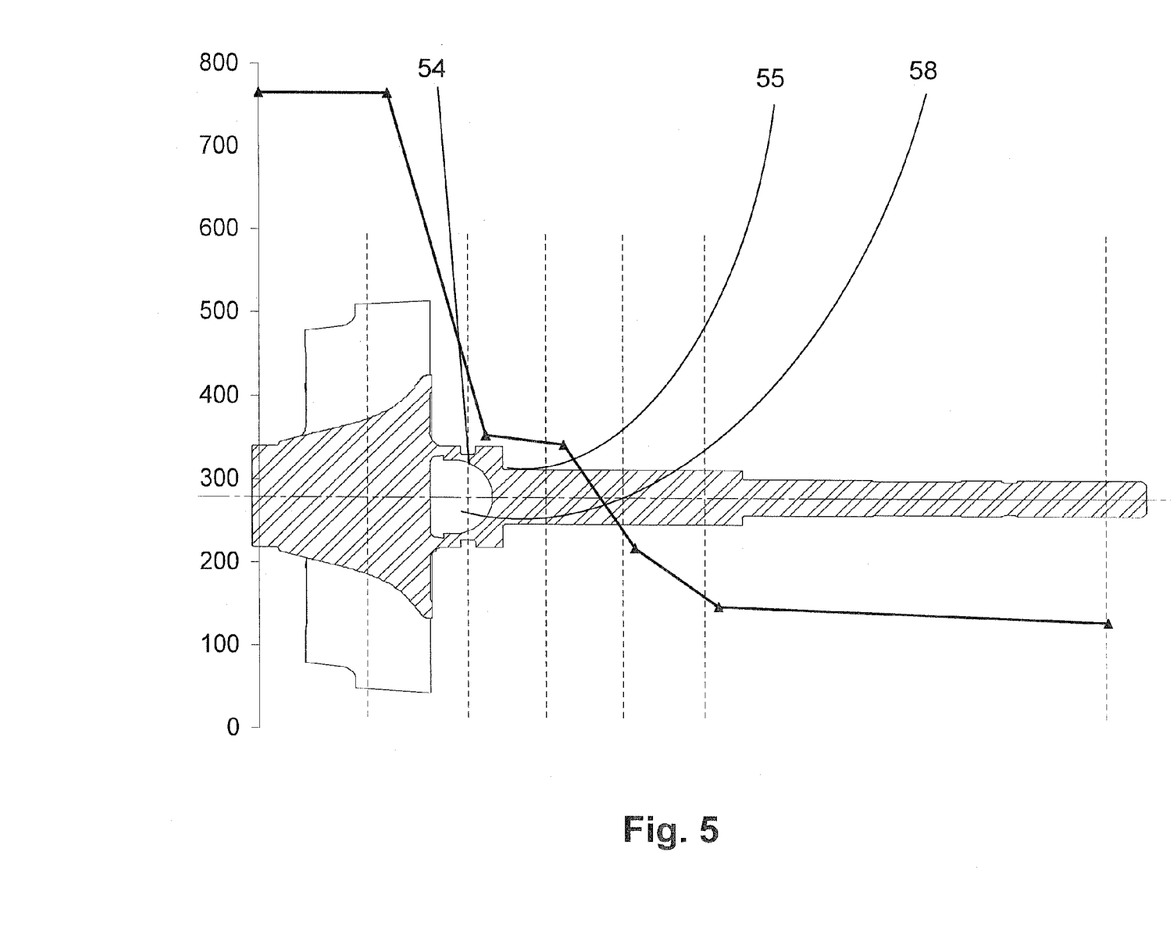
FIG. 5 depicts a shaft and wheel section overlaid with the temperature.

Dynamic testing of turbochargers by the inventors revealed the temperature at stations along the rotating assembly. In FIG. 5, the stations are marked as broken lines, and the temperature at each station is shown as triangles on the heavy line. The "X" axis of the superimposed chart is the geometric position down the shaft and wheel, and the "Y" axis is the temperature in degrees centigrade. It can be seen that there is a large reduction in temperature as the heat flow passes around the air dam (58) to the piston ring boss (54), but that the rate of fall of temperature towards the piston ring boss, compressor end face (55), and then the compressor is much less after the air dam. Most of this temperature reduction is due to the heat transfer to the oil passing through and around the journal bearings. Without the air dam, the oil will overheat, to coke and varnish the journal bearing surfaces.

One method of increasing the efficiency of the turbocharger has been the adoption of ball bearings to support the rotating assembly. While the present invention is applicable to any type of rolling element bearings (REBs) including. e.g., ball bearings, roller bearings, needle bearings, tapered roller bearings (conical rollers that run on conical races), and spherical roller bearings (rollers that are thicker in the middle and thinner at the ends), in practice REBs are commercially represented by turbochargers with ball bearing cartridges, and thus roller bearing turbochargers will be used herein by way of example when discussing particular embodiments.

There are several improvements that come with the adoption of rolling element bearing turbochargers. There is an improvement in transient response due to the reduction in power losses, especially at low turbocharger RPM, of the REB system over the typical turbocharger bearing system. The power losses in REB systems are less than those for typical sleeve type turbocharger bearing systems. REB systems can support much greater thrust loads than can typical turbocharger bearing systems making the thrust component more robust. Since typical ramp and pad thrust bearings require a large percentage of the oil flow delivered to the turbocharger, and REB systems require less oil flow (than a typical turbocharger bearing system), then less oil flow is required for a REB system with the positive consequence that there is less propensity for oil passage to the compressor or turbine stages where that oil can poison the catalyst.

While ball bearing systems provide these efficiency and transient performance gains, the damping capacity of ball bearings is not as good as that of the typical turbocharger double hydrodynamic squeeze film bearings. For this reason, the ball bearing assemblies are retained in a steel cartridge, which is suspended within the bearing housing by an oil film between the O.D. of the cartridge and the I.D. of the bearing housing bore.

In high speed ball bearing development, much work has been done to improve the speed and life of the bearing system, especially in the area of the relationship between bearing power losses and oil flow. In NASA 2001-210462, the writers teach that: conventional jet lubrication fails to adequately cool and lubricate the inner race contact because lubricant is thrown centrifugally outward, and while increasing the flow rate results in carrying away more heat, it also adds to the heat generated from oil churning. The writers also note that bearing power loss is a direct function of oil flow to the bearing. Bearing life is an inverse function of temperature; the difference in temperature between the individual bearing ring components; and the resultant elastohydrodynamic film thickness.

It is known that ball bearings are very sensitive to speed, load, heat, internal clearances and oil flow. Gains in any of heat, internal clearances, and oil flow, subject areas can produce a wider working envelope, which can be then taken as increase in speed, life, or a combination of both. As the tolerances of the components in a ball bearing are tightened, the speed capacity goes up, but also the cost will rise.

So it can be seen that the temperature of the inner ball race is critical to ball bearing life and to the ability of the system to attain turbocharger level speeds.

In the ball bearing cartridges available today, it is clear that reduction of bearing temperature, caused by heat input from the turbocharger turbine wheel to the ball bearing system, has not been recognized as an area of potential for improvement. There is always a need with ball bearing turbochargers to achieve the desired speed and life at the lowest cost.

SUMMARY OF THE INVENTION

The present invention relates to the addition of a spacer of low thermal conductivity, or a thermal block, to a turbocharger rolling element bearing assembly to inhibit the flow of heat from the shaft and wheel to the bearings.

BRIEF DESCRIPTION OF THE DRAWINGS

The present invention is illustrated by way of example and not limitation in the accompanying drawings in which like reference numbers indicate similar parts and in which.

DETAILED DESCRIPTION OF THE INVENTION

The inventors realized that the temperature of the inner race of a rolling element bearing assembly (REB) was a critical determining factor in both the bearing system attaining the desired speed and in the bearing system attaining appropriate life.

Figure 2:
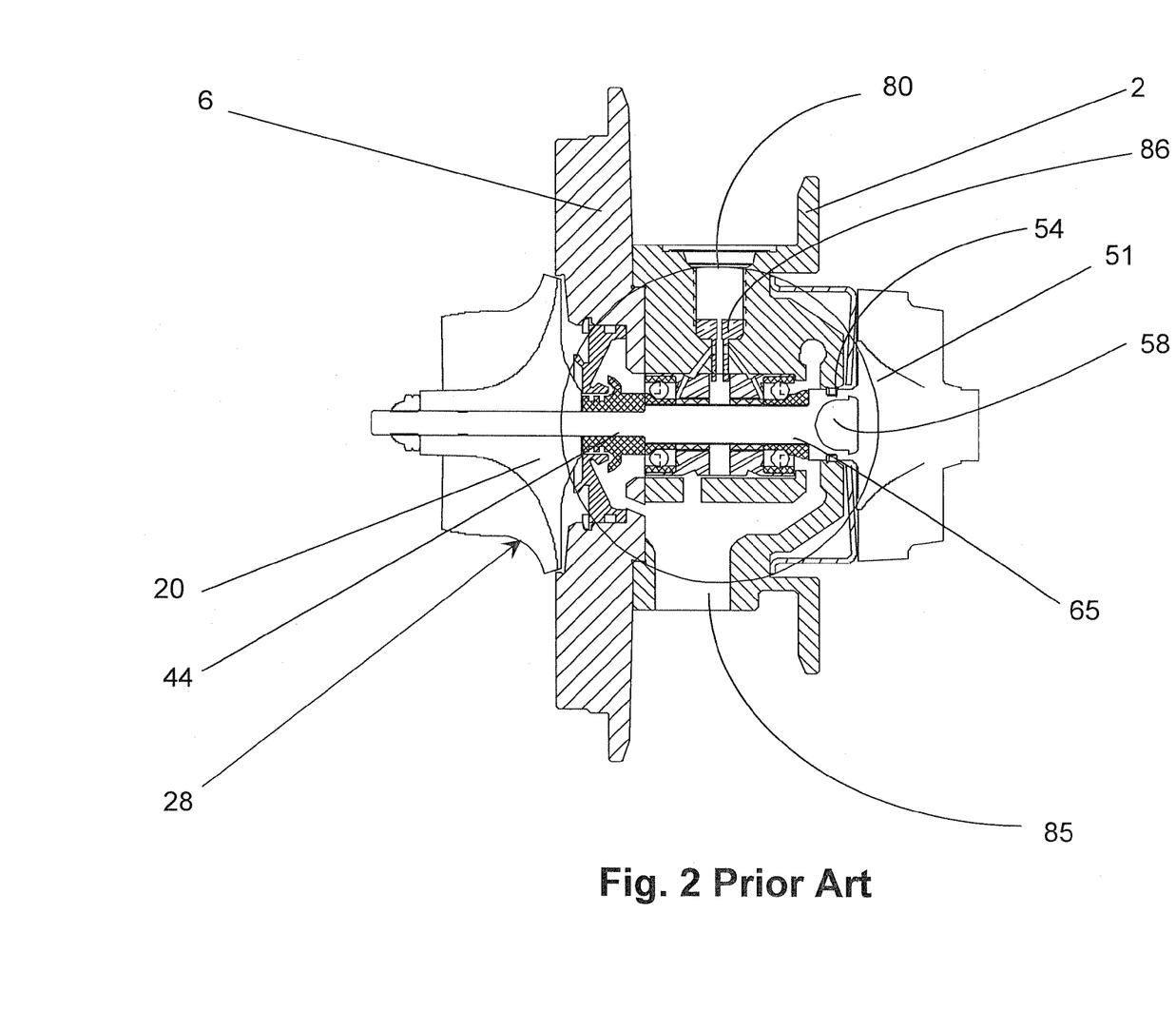
FIG. 2 depicts a section of a typical ball bearing turbocharger bearing housing assembly.
Figure 3:
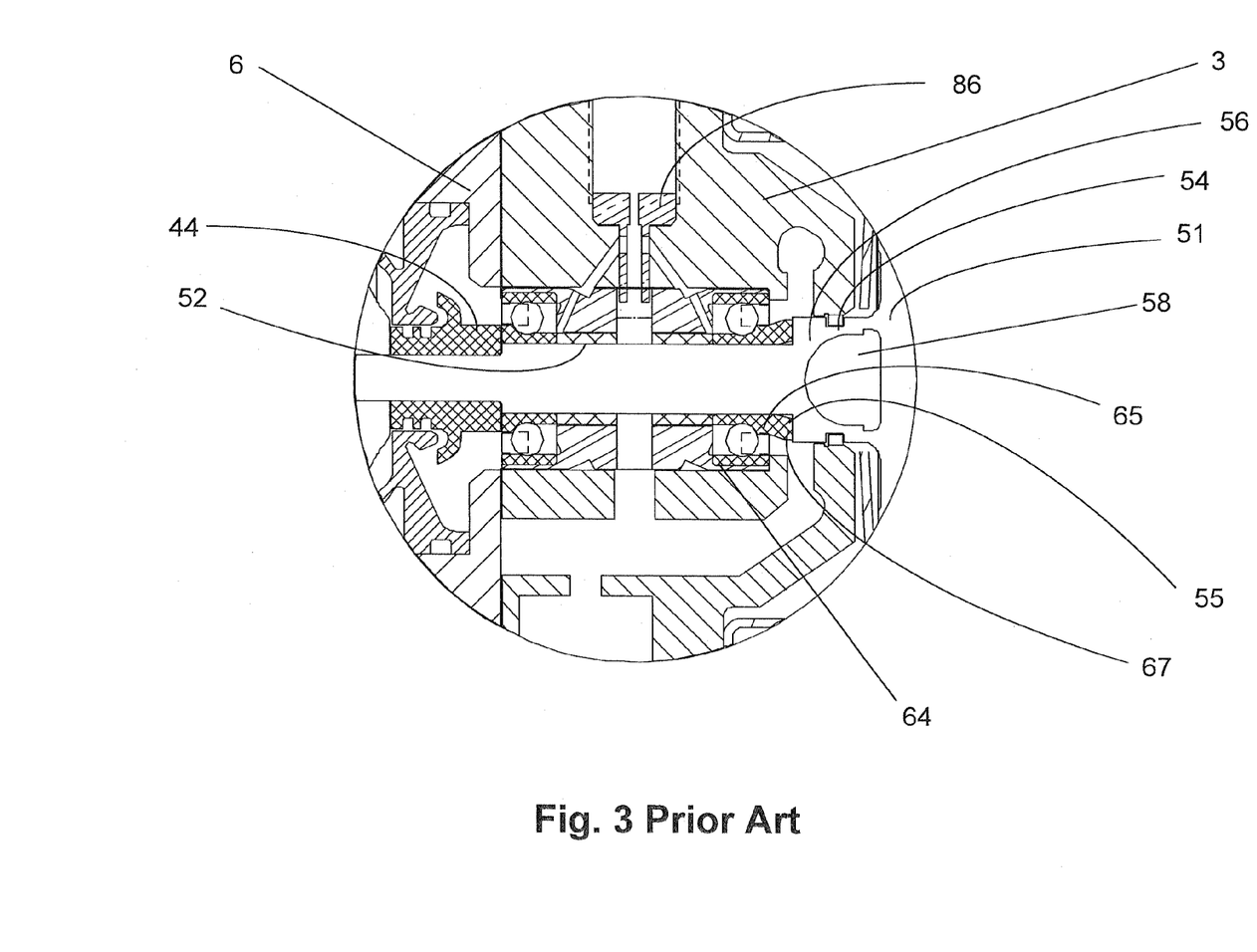
FIG. 3 depicts a magnified view of FIG. 2.

FIGS. 2 and 3 depict the design of typical REB configurations. The inner bearing race (65) has a turbine-end side face (54) and a compressor-end side face. The turbine-end side face (67) of the inner bearing race (65) butts against the compressor-end surface (55) of the piston ring boss (56) of the shaft and wheel to transmit axial loads to the inner race of the bearing. This metal to metal connection acts as a conduction path for heat flowing around the periphery of the air dam (58) to the ball bearing inner race.

By reducing the axial length of the bearings and inserting a thermal barrier element (90) (FIG. 7) between the compressor-end of the piston ring boss (55) and the turbine end (67) of inner race (65) of the REB, the flow of heat from the piston ring boss to the inner race is vastly reduced. As explained above, the heat flow from the turbine wheel towards the shaft is inhibited by the presence of the air dam (58) as can be seen by the shaft temperatures in FIG. 5.

Figure 6:
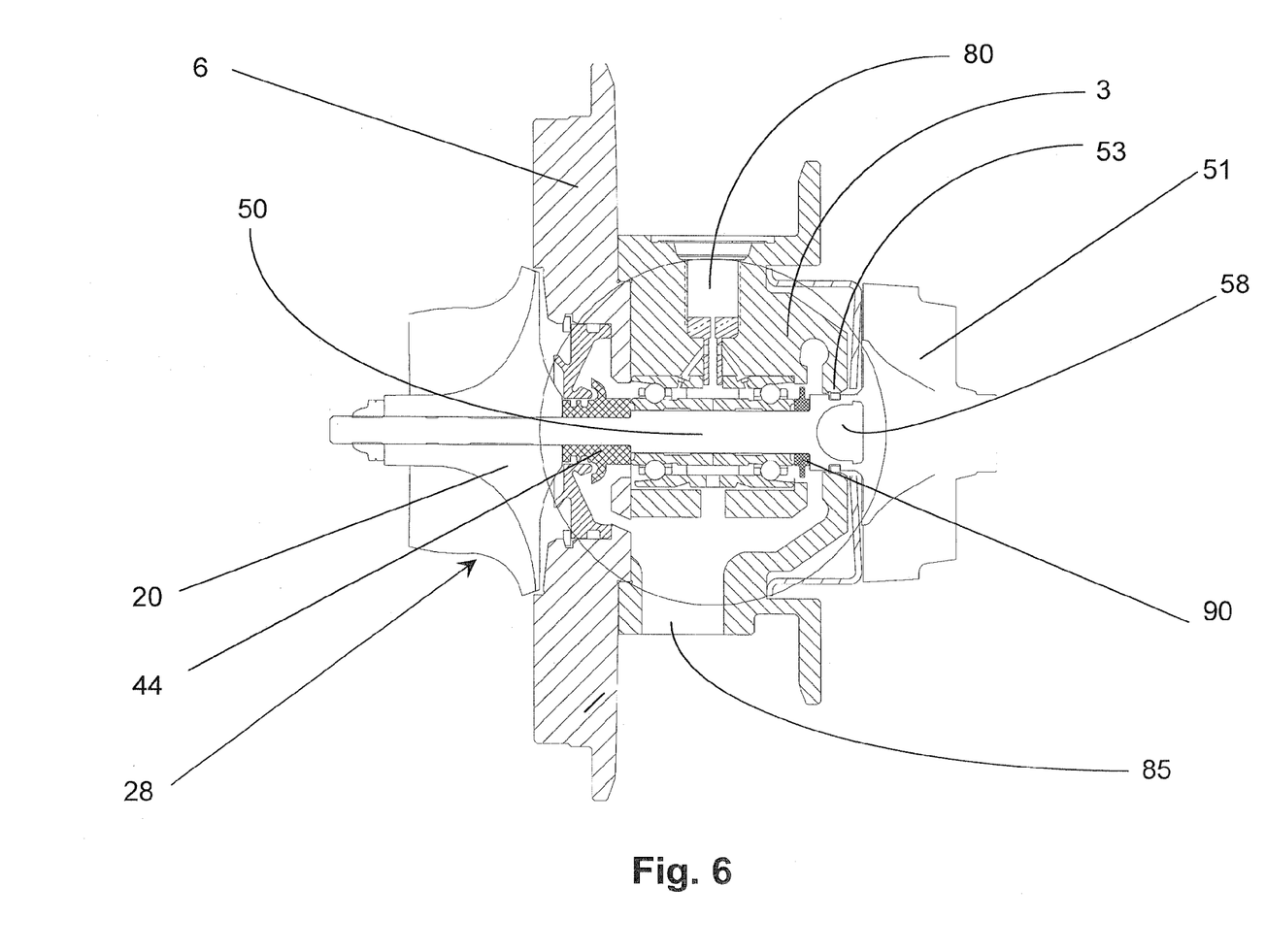
FIG. 6 depicts the first embodiment of the invention.
Figure 7:
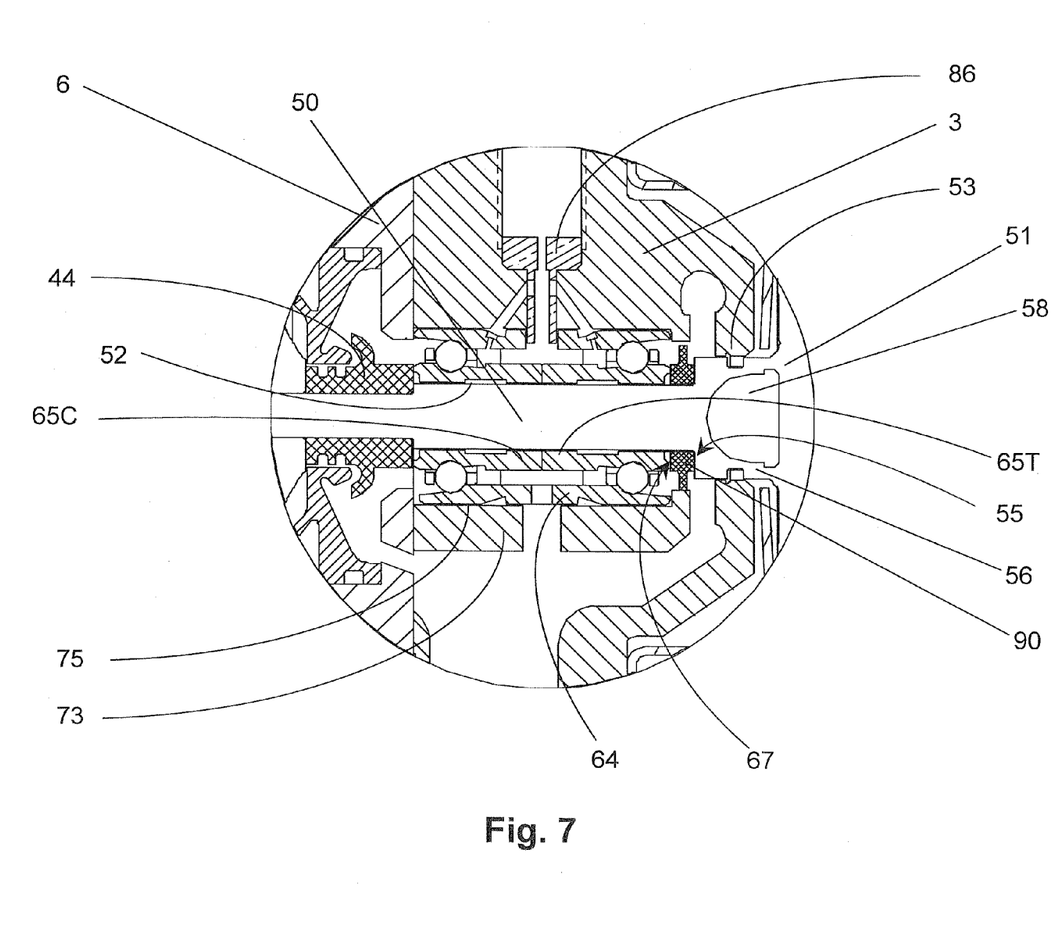
FIG. 7 depicts a magnified view of FIG. 6.
Figure 8:
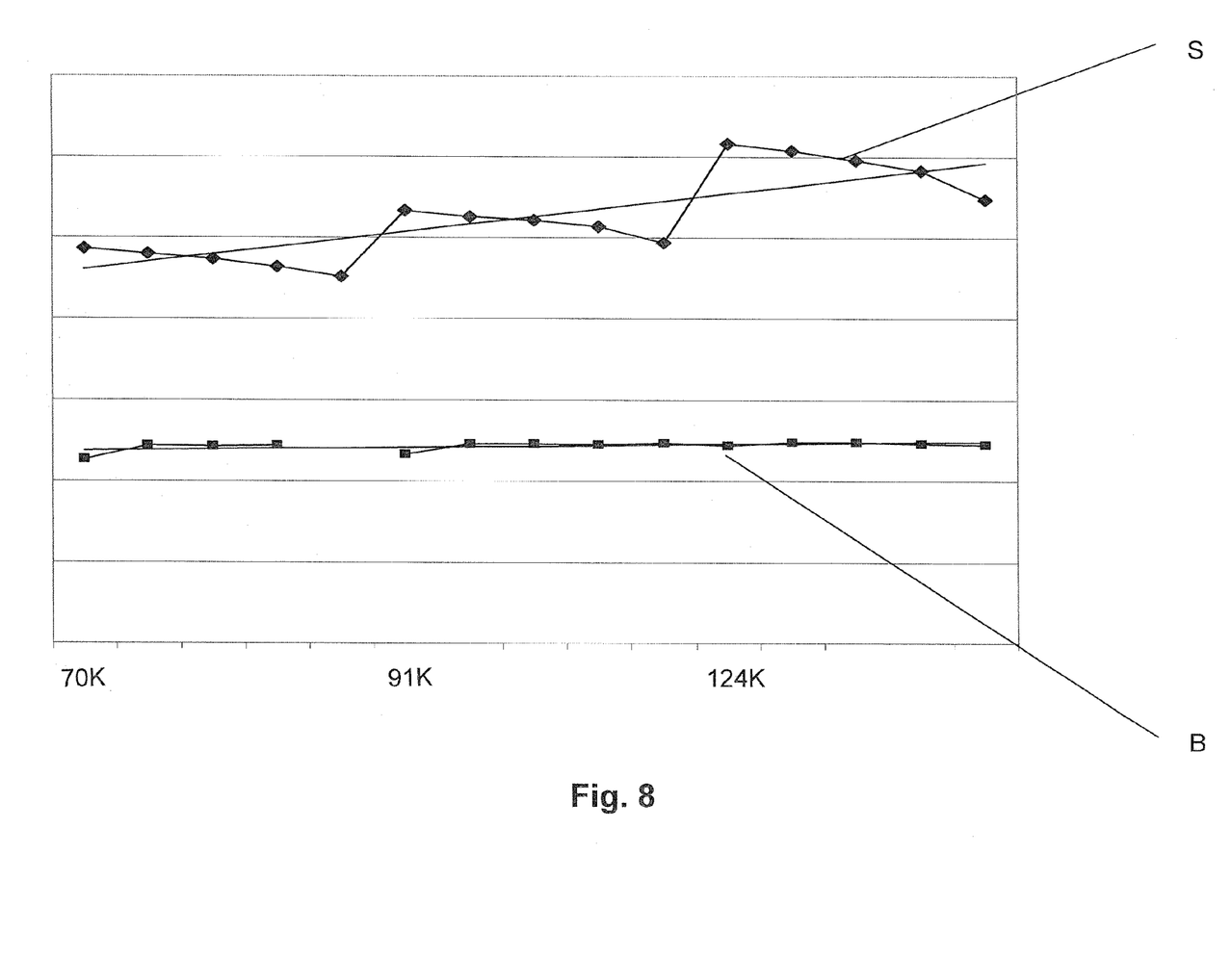
FIG. 8 depicts a comparison of oil flow rates.

Since REBs are limited in both life and operating speed, partially by the temperatures of the inner and outer races, the inclusion of a thermal barrier (90), FIGS. 6 and 7, allows for a wider operating envelope which can be translated into greater speed and longer life of the REB, or into greater speed or longer life, depending upon how the improvement is used. This improvement is enabled because the temperature of the inner race is reduced by the thermal barrier element (90) inhibiting the heat flow (114) in the turbine wheel, from the metal in the periphery of the air dam (58) of the piston ring boss (56), to the heat flow (115) in the piston ring boss compressor-end face (55), to the inner REB race (65).

Since the mean oil flow through a typical turbocharger double hydrodynamic squeeze film bearing configuration is 240% greater than the oil flow through a REB configuration, the quantity of heat rejected by the REB to the oil is limited, thus exacerbating the temperature limitations of REBs. In typical REB turbochargers, the oil flow to the bearings is limited by the introduction of a restriction (86) in the oil inlet (80). So the introduction of the thermal barrier in accordance with the invention provides a large improvement in capability of the bearing system.

The construction of the thermal barrier must be capable of carrying the compressive loads exerted on the stack of components mounted on the journal bearing section of the shaft and wheel.

In the exemplary embodiment of the invention, the thermal barrier element is a short cylinder, with a flange section, the element being constructed of an alloy of titanium. The material could be titanium, a superalloy such as INCONEL (a registered trademark of Special Metals Corporation, New Hartford, N.Y.), INCOLOY (a registered trademark of Special Metals Corporation, New Hartford, N.Y.), or HASTELLOY (a registered trademark of Haynes International, Inc., Kokomo, Ind.); Inconel, Incoloy, or Hastelloy; or it could be a ceramic material. The material of the thermal barrier has a coefficient of thermal conductivity lower than that of either the bearing inner race or the bearing boss of the shaft and wheel.

The thermal barrier element can have a radial extension which serves two purposes: One is as an oil flinger to prevent the flow of oil from the bearings getting to the piston ring area and into the combustion gas flow, the other is to serve as a push-off tool to aid in pressing the shaft out of the bearing assembly. To remove the shaft and wheel (50) from the assembly of bearing housing (3) and REB assembly, the shaft is pressed (against the bearing housing) from the compressor wheel end such that the flange of the thermal barrier (90) presses against the abutment of the piston ring boss (53) in the bearing housing. This in turn then resists the force (from the compressor end of the shaft and wheel) to the inner race (65T) of the REB allowing the shaft to be pushed out of the bearing.

In the illustrated embodiment, the bore of the thermal barrier element (90) corresponds in shape (e.g., round) and diameter substantially to the outside diameter of the journal bearing inner diameter, i.e., the outer diameter of the shaft and wheel. The outside surface of the thermal barrier is generally cylindrical with a diameter approximately greater than that of the bearing housing piston ring boss (53) so that the piston ring boss (53) of the bearing housing, can act as an abutment to the thermal spacer (90) in order to remove the shaft and wheel (50) from the REB inner races (65T and 65C). The thermal barrier is axially interposed between the turbine-end face (67) of the REB inner race (65T) and the compressor-end face (55) of the piston ring boss (56) of the shaft and wheel.

In a variation to the first embodiment of the invention, the thermal barrier element is a short cylinder, constructed of materials as in the exemplary embodiment above.

The thermal barrier could also be a more common base material such as steel coated with a low thermal conductivity coating such as yttria-stabilized zirconia (see for example U.S. Pat. No. 6,998,172, incorporated herein by reference).

Figures 9A, 9B:
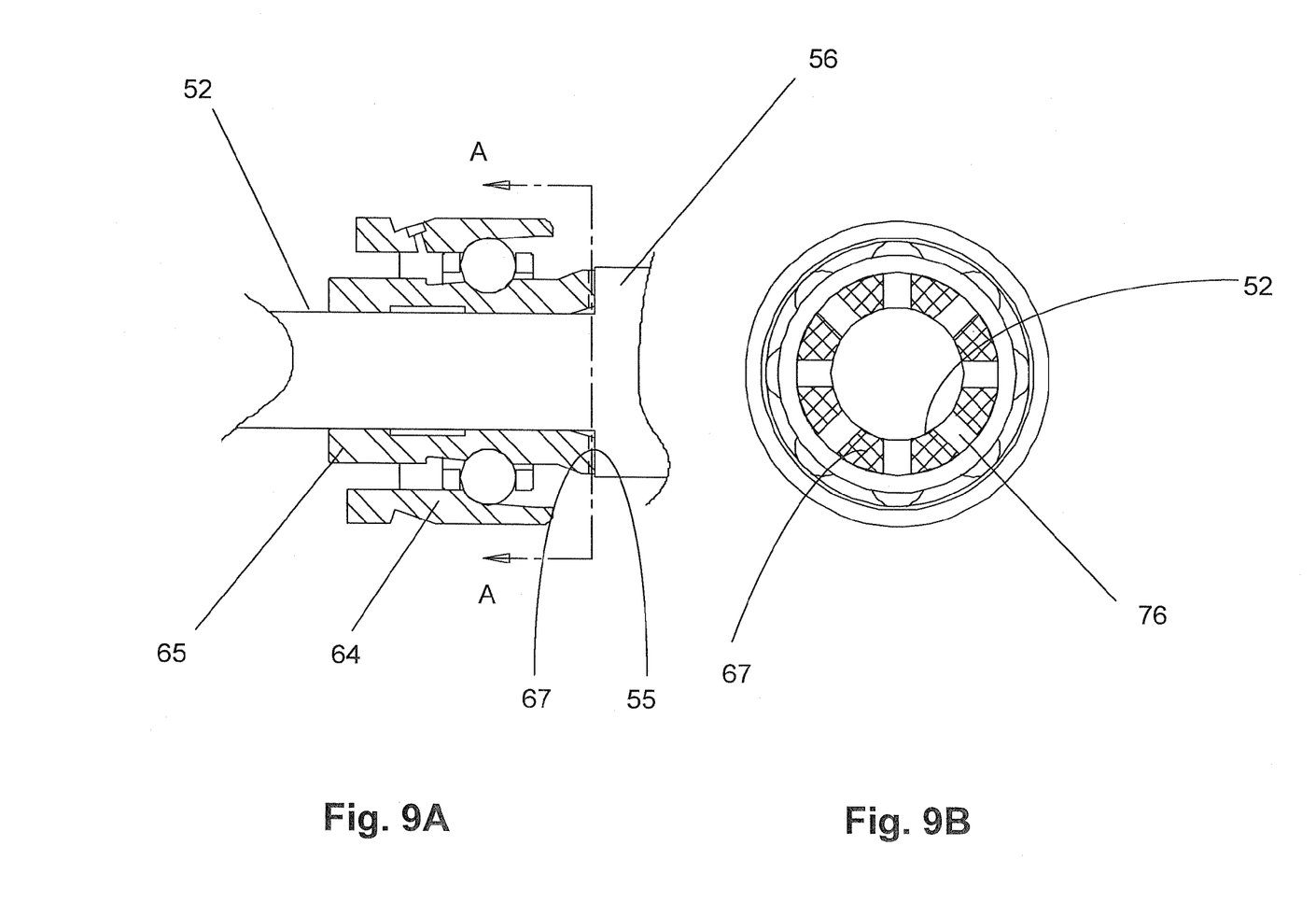
FIGS. 9A and 9B depict the second embodiment of the invention.

In the second embodiment of the invention, the thermal path from the piston ring boss to the inner race of the REB is inhibited by reducing the available flow path from the piston ring boss to the inner race. In FIGS. 9A and 9B, the turbine end face (67) of the inner race (65) has been scalloped out to present sufficient surface area to transmit the axial loads from the rotating assembly to the inner race of the REB, but also to present the minimum heat transfer path from the compressor-end face (55) of the piston ring boss (56) to the inner race (65) of the REB. In the exemplary embodiment, these scallops are simply eight symmetrical scallops (76) cut into the face (67) of the inner race, leaving eight symmetrical load bearing surfaces (67) to transmit the axial loads. The number and size of the scallops are not important. What is important is the reduction in surface area.

In the third embodiment of the invention, the thermal barrier is provided by coating the compressor-end face (55) of the piston ring boss (56) and the turbine end face (67) of the inner bearing race (65) with a low thermal conductivity coating or surface treatment such as yttria-stabilized zirconia.

Now that the invention has been described, we claim:

1. A turbocharger comprising:
   a rotating assembly comprising a shaft (50) and a turbine wheel (51) solidly affixed to one end of the shaft,
   a bearing housing (3) supporting a rolling element bearing comprising an inner race (65) and an outer race (64) which are each provided with a raceway, and a series of rolling elements which are in contact with the raceways of each race,
   a thermal barrier element (90) carried on said shaft between said turbine wheel and said inner race, and
   a piston ring boss (56) at the turbine end of the shaft, the piston ring boss (56) having a compressor-facing end (55),
   wherein said shaft (50) is supported for rotation by said rolling element bearing, and said thermal barrier element (90) is provided between said piston ring boss compressor-facing end (55) and said inner race (65).

2. The turbocharger as in claim 1, wherein said thermal barrier element (90) is comprised of a material having a coefficient of thermal conductivity equal to or lower than that of either the bearing inner race or a bearing boss of the rotating assembly.

3. The turbocharger as in claim 1, wherein said thermal barrier element (90) is comprised of titanium, a titanium alloy, a superalloy, or a ceramic material.

4. The turbocharger as in claim 1, wherein said thermal barrier element (90) is comprised of a metal coated with a coating having a lower thermal conductivity than said metal.

5. The turbocharger as in claim 4, wherein said coating is a yttria-stabilized zirconia.

6. The turbocharger as in claim 1, wherein said inner race (65) is axially constrained by said thermal barrier element (90).

7. The turbocharger as in claim 1, wherein said thermal barrier element (90) includes a radial extension which serves as an oil flinger.

8. The turbocharger as in claim 1, wherein said thermal barrier element (90) has an inner race (65) contacting end face, wherein said inner race has a thermal barrier element (90) contacting end face, and wherein at least one of said end faces does not form a continuous ring with constant inner and outer diameter about its entire circumference.

9. The turbocharger as in claim 1, wherein said rolling element bearing is selected from the group consisting of ball bearings, roller bearings, needle bearings, tapered roller bearings, and spherical roller bearings.

10. The turbocharger as in claim 1, wherein said rotating assembly further comprises a piston ring boss at the turbine end of the shaft, the piston ring boss having a compressor-facing end, and wherein said thermal barrier element is provided entirely within an axial spacing between said piston ring boss compressor-facing end and said inner race.

11. A turbocharger comprising:
  a rotating assembly comprising a shaft (52) and a turbine wheel (51) solidly affixed to one end of the shaft, and a piston ring boss (56) at the turbine end of the shaft, the piston ring boss (56) having a compressor-facing end face (55); and
  a rolling element bearing comprising an inner race and an outer race which are each provided with a raceway, and a series of rolling elements which are in contact with the raceways of each race, the inner race including a piston ring boss facing end face, wherein said shaft is supported for rotation by said rolling element bearing,
  wherein at least one of said piston ring boss (56) compressor-facing end face (55) and said inner race piston ring boss (56) facing end face are coated with a low thermal conductance coating.

* * * * *